US012774742B2

(12) United States Patent
Qionghua

(10) Patent No.: US 12,774,742 B2
(45) Date of Patent: Oct. 27, 2026

(54) METHOD FOR MONITORING A GEARED MOTOR, INCLUDING MEASURING A GEARBOX OIL LEVEL AND A GEARBOX VIBRATION, AND SYSTEM ADAPTED TO PERFORM THE METHOD

(71) Applicant: SEW-EURODRIVE GMBH & CO. KG, Bruchsal (DE)

(72) Inventor: Gao Qionghua, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 447 days.

(21) Appl. No.: 18/034,191

(22) PCT Filed: Oct. 13, 2021

(86) PCT No.: PCT/EP2021/025401
§ 371 (c)(1),
(2) Date: Apr. 27, 2023

(87) PCT Pub. No.: WO2022/089776
PCT Pub. Date: May 5, 2022

(65) Prior Publication Data

US 2023/0392684 A1 Dec. 7, 2023

(30) Foreign Application Priority Data

Oct. 27, 2020 (CN) ......................... 202011163072.X
Nov. 30, 2020 (DE) ..................... 10 2020 007 292.5

(51) Int. Cl.
*G01M 13/028* (2019.01)
*F16H 57/01* (2012.01)
(Continued)

(52) U.S. Cl.
CPC ......... *F16H 57/0449* (2013.01); *F16H 57/01* (2013.01); *G01M 13/028* (2013.01);
(Continued)

(58) Field of Classification Search
CPC .................................................. G01M 13/028
See application file for complete search history.

(56) References Cited

U.S. PATENT DOCUMENTS 6,425,293 B1 7/2002 Woodroffe
6,434,512 B1 8/2002 Discenzo
(Continued)

FOREIGN PATENT DOCUMENTS

CN 101960177 A 1/2011
DE 102008013059 A1 9/2009
(Continued)

OTHER PUBLICATIONS

Translation of KR 102074161; inventor Kang Dae Sig; publication date Feb. 6, 2020.*
(Continued)

*Primary Examiner* — Eric S. McCall
(74) *Attorney, Agent, or Firm* — Carter, DeLuca & Farrell LLP

(57) ABSTRACT

In a method for monitoring a geared motor, and a system, the geared motor has a gearbox at least partially filled with oil. A measure of the oil level, e.g., a measure of the filling-level height of the oil, is captured, and a measure of vibration is captured at at least one point of the gearbox. A first variable is formed by combining the measure of the oil level and the measure of vibration, and it is monitored whether the value of the first variable exceeds a permissible extent of deviation from a setpoint value or exceeds a threshold value.

21 Claims, 1 Drawing Sheet

(51) Int. Cl.
*F16H 57/04* (2010.01)
*F16H 57/02* (2012.01)

(52) U.S. Cl.
CPC .. *F16H 2057/016* (2013.01); *F16H 2057/018* (2013.01); *F16H 2057/02034* (2013.01)

(56) References Cited

U.S. PATENT DOCUMENTS

| | | | | |
|---|---|---|---|---|
| 6,694,285 | B1 * | 2/2004 | Choe | G01H 1/003 702/56 |
| 9,893,672 | B2 | 2/2018 | Wesenberg | |
| 9,958,052 | B2 | 5/2018 | Bader | |
| 10,608,564 | B1 | 3/2020 | Johnson | |
| 2008/0140349 | A1 * | 6/2008 | Behera | G05B 23/0283 702/182 |
| 2014/0347043 | A1 * | 11/2014 | Chana | G01N 27/9046 324/242 |
| 2020/0256746 | A1 * | 8/2020 | Lowry | G01K 13/08 |
| 2022/0334027 | A1 * | 10/2022 | Rutkevicius | G05B 23/0283 |
| 2023/0086049 | A1 * | 3/2023 | Rakuff | G06N 5/022 702/34 |
| 2023/0135586 | A1 * | 5/2023 | Rutkevicius | G01M 13/021 73/115.02 |

FOREIGN PATENT DOCUMENTS

| | | | |
|---|---|---|---|
| DE | 102011121272 | A1 | 6/2013 |
| EP | 1217261 | A2 | 6/2002 |
| KR | 102074161 | B1 | 2/2020 |

OTHER PUBLICATIONS

International Search Report issued in corresponding International Application No. PCT/EP2021/025401 dated Jan. 27, 2022, pp. 1-2, English Translation.

International Report on Patentability issued in corresponding International Application No. PCT/EP2021/025401 dated May 2, 2023, pp. 1-8, English Translation.

* cited by examiner

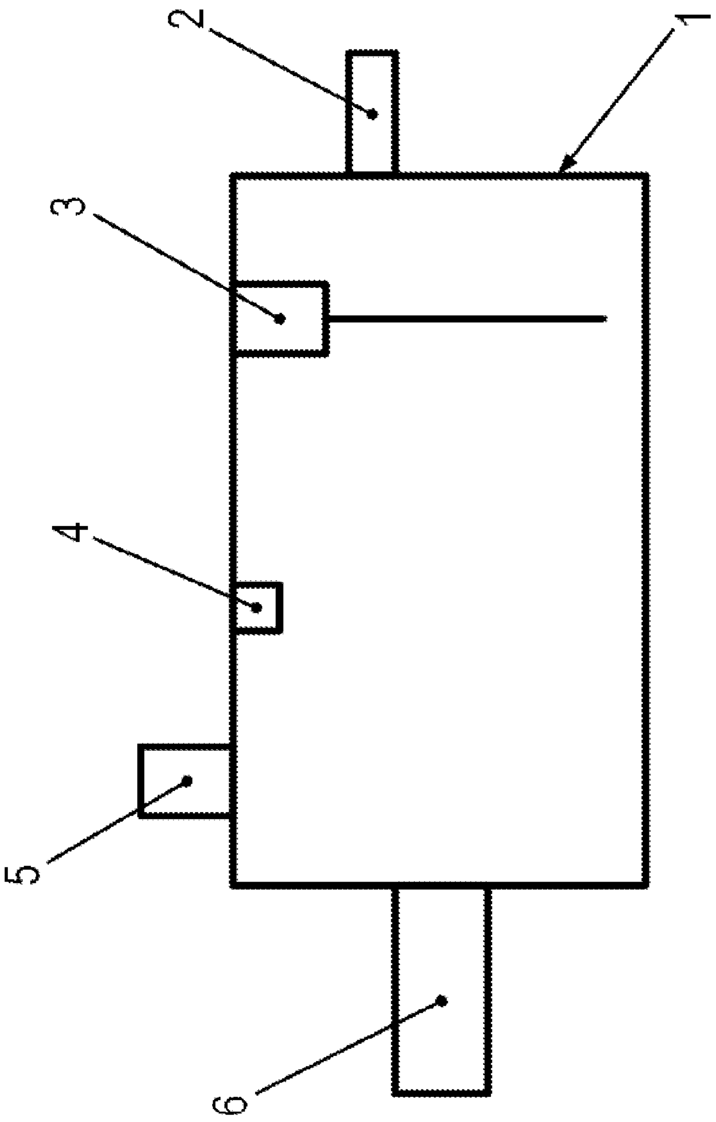
1
2
3
4
5
6

METHOD FOR MONITORING A GEARED MOTOR, INCLUDING MEASURING A GEARBOX OIL LEVEL AND A GEARBOX VIBRATION, AND SYSTEM ADAPTED TO PERFORM THE METHOD

FIELD OF THE INVENTION

The present invention relates to a method for monitoring a geared motor and to a system.

BACKGROUND INFORMATION

In certain conventional systems, it is possible to detect the speed at the rotor shaft of an electric motor.

A modular data collection system is described in U.S. Pat. No. 6,434,512.

An optimization of the time intervals for oil-change for a transmission is described in European Patent Document No. 1 217 261.

A method for temperature-dependent control of an electric motor is described in German Patent Document No. 10 2011 121 272.

A system with gearbox is described in German Patent Document No. 10 2008 013 059.

SUMMARY

Example embodiments of the present invention provide a drive that can be flexibly adapted, and that can provide a high level of safety.

According to an example embodiment of the present invention, in a method for monitoring a geared motor that has a gearbox at least partially filled with oil, a measure of the oil level, e.g., a measure of the filling-level height of the oil, is captured, and a measure of vibration is captured at at least one point of the gearbox, a first variable is formed by combining the measure of the oil level and the measure of vibration, and it is monitored whether the value of the first variable exceeds a permissible extent of deviation from a setpoint value or exceeds a threshold value.

An advantage is that the combined variables change their signals when the oil level drops.

According to example embodiments, in the case of exceedance, warning information is displayed and/or forwarded and/or an emergency shutdown of the electric motor supplied by an inverter and driving the gearbox or the activation of a safe state of the electric motor supplied by an inverter and driving the gearbox is effected. An advantage is that increased safety can be achieved.

According to example embodiments, the combination has a division, and the first variable is formed as a quotient of the measure of vibration and the measure of the oil level. An advantage is that a simple mathematical operation is sufficient to increase the sensitivity.

According to example embodiments, the combination has a division, and the first variable is formed as a quotient of a product, formed from the measure of vibration and a measure of temperature of the gearbox, and the measure of the oil level. An advantage is that a high sensitivity is achievable by the simple mathematical operations and thus monitoring can be carried out efficiently.

According to example embodiments, the measure of vibration is an average of the Fourier transformed temporal progression of the measure of vibration, e.g., in a frequency band. An advantage is that a frequency of the frequency band generated by a bearing provides a large contribution to the measure when the bearing has deteriorated lubrication.

According to an example embodiment of the present invention, a system, e.g., for carrying out a method mentioned above, has a gearbox driven by an inverter-fed electric motor and has a modularly configured evaluation unit. The evaluation unit has evaluation modules, a central module, and a supply module.

An advantage is that a modular configuration of the evaluation unit makes it possible to add further evaluation units and thus to add further sensors via the evaluation units, so that the central module is able to perform improved evaluations. The number of evaluation units, and thus also sensors, can be adapted to the respective drive task. This means that costs and effort can be flexibly adjusted. For example, a sensor for capturing the torque delivered to the output shaft and/or the speed delivered to the output shaft can also be captured and transferred to the central module. The central module is connected not only to a display device for displaying warning information, but also to a controller that drives the inverter feeding the electric motor. However, this also increases safety, since a sensor can be added in a simple manner and thus improved monitoring of the gearbox, e.g., improved condition monitoring, can be carried out by the central module.

According to example embodiments, the evaluation modules, the central module, and the supply module are arranged in a row. An advantage is that the modules can be arranged in a single row one behind another, thus allowing a concise configuration of the evaluation unit. In addition, another evaluation module can be added at the end without having to make hardware changes to the rest of the evaluation unit.

According to example embodiments, the evaluation modules and the central module are electrically supplied in parallel from the supply module. An advantage is that the evaluation modules and the central module can be supplied with DC voltage from a supply module fed by an AC voltage supply network. For example, the supply module has a rectifier and, for example, a smoothing capacitor. For example, the DC voltage supply is looped through the evaluation modules and the evaluation modules, which are arranged in a row touching each other, are connected by electrical plug-in connections.

According to example embodiments, a respective sensor arranged on the gearbox is electrically connected to an evaluation module uniquely assigned to it. An advantage is that each of the sensor signals can be processed individually. For example, a low-pass filtering of the sensor signal, an amplification, and/or an offset voltage can be applied or added. In addition, an analog signal can be converted into a digital data stream which is fed to the central module.

According to example embodiments, each evaluation module has its own housing. An advantage is that the signal processing within the respective module can be carried out without interfering signals from the other modules.

According to example embodiments, each evaluation module is connected to the central module by a wireless or wired data transmission channel. An advantage is that the data recorded and processed by the sensor can be transmitted to the central module. This means that the signals from different sensors can be combined together and the result of the combining can be analyzed for an impermissible extent of deviation from a setpoint or setpoint range, e.g., as condition monitoring.

According to example embodiments, the central module has a device adapted to combine sensor signals, the result of which is fed to a monitoring device, which is connected to a display device displaying warning information and/or to a device adapted to shut down the electric motor. An advantage is that improved monitoring can be achieved. This is because simply monitoring the values of a single variable for exceeding a threshold value can lead to errors, since the occurrence of fluctuations, especially in the range of the threshold value, can falsify the monitoring. According to example embodiments of the present invention, however, a plurality of variables are combined and thus a more sensitive combination variable is formed.

According to example embodiments, a first sensor is adapted to capture the oil level, e.g., to capture the oil level height of the oil present in the gearbox. An advantage is that the filling level height is monitored and can be combined with other variables. Thus, a combined combination variable can be formed, to which the signals of a further sensor can be added, which combined combination variable also generates changed signals when the oil level drops. For example, the structure-borne sound amplitudes averaged in a frequency band increase.

According to example embodiments, a second sensor is adapted to capture the vibration of the gearbox. An advantage is that the structure-borne sound amplitudes of the gearbox can be determined, e.g., in the vicinity of a bearing of the gearbox, and can be combined with sensor signals of further sensors.

According to example embodiments, a third sensor is adapted to capture the temperature of the gearbox. For example, the third sensor is an infrared sensor and/or the third sensor is arranged within a housing part of the gearbox. An advantage is that the signals from a third sensor can be combined with the signals from the other two sensors, so that different physical variables which change their signals when the oil level drops can be determined.

Further features and aspects of example embodiments of the present invention are explained in more detail below with reference to the appended schematic FIGURE.

BRIEF DESCRIPTION OF THE DRAWING

FIG. 1 schematically illustrates a gearbox system according to an example embodiment of the present invention.

DETAILED DESCRIPTION

The gearbox has a housing part 1 in which bearings are accommodated for supporting shafts to which toothed parts are connected in a rotationally fixed manner.

The input shaft 2, e.g., the driving shaft, the input shaft, etc., is connected to the rotor shaft of an electric motor in a rotationally fixed manner or via a coupling.

The output shaft 6 can be connected to a load to be driven.

Sensors are arranged on or in the housing part 1, e.g., an oil level sensor 3 for capturing the oil level surrounded by the housing part 1, a temperature sensor 4 for capturing the temperature inside the housing part, and a vibration sensor 5, e.g., a structure-borne sound sensor, for capturing the mechanical, e.g., acoustic, oscillations of the housing part 1.

The signals of the sensors are fed to a modular-structured evaluation unit.

The evaluation unit has evaluation modules, a central module, and a supply module, which are arranged in a row. The evaluation modules and the central module are electrically supplied in parallel from the supply module.

The sensor signal of the oil level sensor 3 is fed to a first of the evaluation modules, the sensor signal of the temperature sensor 4 is fed to a second of the evaluation modules, and the sensor signal of the vibration sensor 5 is fed to a third of the evaluation modules.

The central module is connected to the evaluation modules by a data transmission channel.

The measured values captured and determined by the sensors and the evaluation modules are evaluated in the central module, in which a condition monitoring is carried out.

The measured values are monitored in the central module such that a warning signal and/or a shutdown signal is output if a permissible extent of deviation from a predefined range is exceeded.

For example, the shutdown signal causes the motor to be shut down, e.g., via an inverter feeding the motor, or activates a safe state of the electric motor. This does not necessarily have to be the stoppage of the rotor shaft but can also be a steady, e.g., uniform, rotation of the rotor shaft of the motor.

In the central module, the measured values determined by the evaluation modules are combined with each other and a monitoring is carried out in dependence thereon.

For example, a first variable can be formed which has the quotient of a product and of the captured level value of the oil level, and the product is determined from the captured temperature and from a vibration value captured by the vibration sensor.

As a value determined from the vibration values captured by the vibration sensor, the amplitude of a filtered-out frequency or the average amplitude of a frequency band is used as an example. Foe example, the signal of the vibration sensor 5 is fed to an FFT and from the Fourier spectrum thus determined for a frequency band a measure of the average amplitude and/or the integral over the amplitudes is formed in dependence on the frequency.

For example, if the oil level drops and thus the lubrication of the bearings and/or the meshing toothed parts deteriorates, the value determined from the vibration values captured by the vibration sensor increases, as does the friction of the meshing values.

Due to the formed combination, e.g., quotient and product formation, the first variable reacts extremely strongly. This is because a small drop in oil level can result in a small increase in vibration and temperature. However, multiplication and division result in a significant change of the value of the first variable. In this manner, a high sensitivity to a change is achieved.

For example, combinations that behave in a qualitatively similar manner mathematically can also be used.

Furthermore, the motor current can be captured by a sensor for capturing the motor current of the electric motor and the signals from this sensor can be fed to a further evaluation module. From there, values determined therefrom are fed to the central module, which combines these values determined in this manner from the captured motor current with values from other sensors, so that the result of the combining can be monitored for an impermissibly large extent of deviation from a permissible value.

For example, the RMS value, e.g., the root mean square value, of the Fourier transformed value progression captured by the vibration sensor 5 is formed, e.g., in a frequency band. From this, the quotient of this RMS value and the value determined from the signal of the oil level sensor 3 is formed and monitored for an impermissibly high extent of deviation from a threshold value. Thus, a variable that is very sensitive to changes caused by lubrication deterioration is accessible for monitoring.

LIST OF REFERENCE NUMERALS

1 Housing part
2 Input shaft, e.g., driving shaft
3 Oil level sensor
4 Temperature sensor
5 Vibration sensor, e.g., structure-borne sound sensor
6 Output shaft

The invention claimed is:

1. A method for monitoring a geared motor that includes a gearbox at least partially filled with oil, comprising:
measuring an oil level of the oil;
measuring a vibration at at least one location of the gearbox;
forming a first variable by combining the measurement of the oil level and the measurement of the vibration; and
monitoring a value of the first variable for exceedance of a permissible extent of deviation from a setpoint value or a threshold value;
wherein, in response to an exceedance, activating a safe state of an electric motor supplied by an inverter and driving the gearbox.

2. The method according to claim 1, wherein the measuring of the oil level includes measuring a filling-level height of the oil.

3. The method according to claim 1, wherein, in response to an exceedance, displaying and/or forwarding warning information.

4. The method according to claim 1, wherein the activating of the safe state of the electric motor includes performing an emergency shutdown of the electric motor.

5. The method according to claim 1, wherein the first variable is formed by division, as a quotient of the measure of vibration and the measure of the oil level.

6. The method according to claim 1, wherein the first variable is formed by division, as a quotient of a product, formed from the measurement of vibration and a measurement of temperature of the gearbox, and the measurement of the oil level.

7. A method for monitoring a geared motor that includes a gearbox at least partially filled with oil, comprising:
measuring an oil level of the oil;
measuring a vibration at at least one location of the gearbox;
forming a first variable by combining the measurement of the oil level and the measurement of the vibration; and
monitoring a value of the first variable for exceedance of a permissible extent of deviation from a setpoint value or a threshold value;
wherein, in response to an exceedance, performing an emergency shutdown of an electric motor supplied by an inverter and driving the gearbox.

8. A method for monitoring a geared motor that includes a gearbox at least partially filled with oil, comprising:
measuring an oil level of the oil;
measuring vibration at at least one location of the gearbox;
determining an average of a Fourier transformed temporal progression of the measurement of vibration;
forming a first variable by combining the measurement of the oil level and the average of the Fourier transformed temporal progression of the measurement of vibration; and
monitoring a value of the first variable for exceedance of a permissible extent of deviation from a setpoint value or a threshold value;
wherein, in response to an exceedance, activating a safe state of an electric motor supplied by an inverter and driving the gearbox.

9. A method for monitoring a geared motor that includes a gearbox at least partially filled with oil, comprising:
measuring an oil level of the oil;
measuring vibration at at least one location of the gearbox;
determining an average of a Fourier transformed temporal progression of the measurement of vibration in a frequency band;
forming a first variable by combining the measurement of the oil level and the average of the Fourier transformed temporal progression of the measurement of vibration in the frequency band; and
monitoring a value of the first variable for exceedance of a permissible extent of deviation from a setpoint value or a threshold value;
wherein, in response to an exceedance, activating a safe state of an electric motor supplied by an inverter and driving the gearbox.

10. A system, comprising:
a gearbox at least partially filled with oil;
an inverter-fed electric motor adapted to drive the gearbox;
a modular evaluation unit including evaluation modules, a central module, and a supply module;
wherein the system is adapted to perform a method that includes:
measuring an oil level of the oil;
measuring a vibration at at least one location of the gearbox;
forming a first variable by combining the measurement of the oil level and the measurement of the vibration; and
monitoring a value of the first variable for exceedance of a permissible extent of deviation from a setpoint value or a threshold value.

11. The system according to claim 10, wherein the evaluation modules, the central module and the supply module are arranged in a row.

12. The system according to claim 10, wherein the supply module is adapted to electrically supply the evaluation modules and the central module in parallel.

13. The system according to claim 10, wherein each evaluation module is electrically connected to a uniquely assigned respective sensor arranged on the gearbox.

14. The system according to claim 10, wherein each evaluation module includes a respective housing.

15. The system according to claim 10, wherein each evaluation module is connected to the central module by a wireless and/or wired data transmission channel.

16. The system according to claim 10, wherein the central module is adapted to combine sensor signals and to feed a result of the combined sensor signals to a monitor device that is connected to a display device adapted to display warning information and/or to device adapted to shut down the electric motor.

17. The system according to claim 10, wherein a first sensor is adapted to measure the oil level and/or to measure an oil level height of oil present in the gearbox.

18. The system according to claim 10, wherein a second sensor is adapted to measure the vibration of the gearbox.

19. The system according to claim 10, wherein, the method includes, in response to an exceedance, activating a safe state of an electric motor supplied by an inverter and driving the gearbox.

20. The system according to claim 10, wherein a third sensor is adapted to measure a temperature of the gearbox.

21. The system according to claim 20, wherein the third sensor includes an infrared sensor and/or is arranged within a housing part of the gearbox.

* * * * *